US005698103A

United States Patent [19]

Kurek

[11] Patent Number: 5,698,103
[45] Date of Patent: Dec. 16, 1997

[54] EXTRACTION OF WATER-SOLUBLE METAL CHELATES USED AS CATALYSTS IN SWEETENING SOUR HYDROCARBON FEEDSTOCKS

[75] Inventor: Paul R. Kurek, Barrington, Ill.

[73] Assignee: UOP, Des Plaines, Ill.

[21] Appl. No.: 726,371

[22] Filed: Oct. 4, 1996

[51] Int. Cl.$^6$ ................................................. B01D 11/04
[52] U.S. Cl. ..................... 210/634; 210/511; 208/189; 208/311; 585/800
[58] Field of Search ............................ 208/189, 311; 585/800; 210/634, 511

[56] References Cited

U.S. PATENT DOCUMENTS

| | | | |
|---|---|---|---|
| 2,918,426 | 12/1959 | Quiquerez et al. | 208/206 |
| 2,966,453 | 12/1960 | Gleim et al. | 208/428 |
| 3,017,458 | 1/1962 | Garbuny | 178/6.8 |
| 3,189,652 | 6/1965 | Pollitzer | 260/584 |
| 3,252,892 | 5/1966 | Gleim | 208/206 |
| 3,457,053 | 7/1969 | Rosenwald | 44/72 |
| 3,929,655 | 12/1975 | Gattuso | 252/51.5 R |
| 3,980,582 | 9/1976 | Anderson, Jr. et al. | 252/428 |
| 4,003,827 | 1/1977 | Carlson | 208/206 |
| 4,078,992 | 3/1978 | Douglas | 208/206 |
| 4,290,913 | 9/1981 | Frame | 208/206 |
| 4,528,100 | 7/1985 | Zarchy | 210/634 |
| 4,547,292 | 10/1985 | Zarchy | 210/634 |
| 5,356,538 | 10/1994 | Wai | 210/634 |

OTHER PUBLICATIONS

*Handbook of Petroleum Refining Processes*, McGraw-Hill Book Company, pp. 9-3 to 9-13 (undated).

*Primary Examiner*—Ernest G. Therkorn
*Attorney, Agent, or Firm*—Thomas K. McBride; Eugene I. Snyder

[57] ABSTRACT

Sweetening of sour hydrocarbon feedstocks by contacting with an aqueous solution of a metal chelate as an oxidation catalyst in the presence of oxygen is hindered by the difficulty of recovering metal chelate. Extraction of the aqueous phase with a liquid secondary amine with low water solubility removes a main portion of the metal chelate, usually a mixture of polysulfonated cobalt phthalocyanines, from the aqueous phase, and subsequent recovery of the chelate from the amine extract enables a viable alternative to feed bed processes.

9 Claims, No Drawings

EXTRACTION OF WATER-SOLUBLE METAL CHELATES USED AS CATALYSTS IN SWEETENING SOUR HYDROCARBON FEEDSTOCKS

BACKGROUND OF THE INVENTION

Many hydrocarbon streams have sulfur-containing compounds as undesirable components whose removal constitutes an important stage of hydrocarbon processing. Where these components are mercaptans, their "removal" generally is only a conversion of mercaptans to disulfides which remain in the feedstock as inoffensive components of the hydrocarbon stream, a process usually referred to as "sweetening" (with the initial mercaptan-laden stream referred to as "sour" feedstock). The conversion of mercaptans to disulfides often is accomplished merely through air oxidation as catalyzed by various metal chelates; see J. R. Salazar in "Handbook of Petroleum Refining Processes" R. A. Myers, editor, pages 9-3 to 9-13.

A sour hydrocarbon feedstock often contains between 0.005 and 0.8 wt-% (measured by elemental sulfur) of sulfur-containing compounds and from about 10 through about 5000 ppm of mercaptans (measured as mercaptan), although usually mercaptan levels are over 100 ppm. A sour liquid hydrocarbon fraction often is sweetened in the presence of an oxidizing agent with a catalytic composite which comprises a metal chelate dispersed on an adsorbent support.

The adsorbent support used can be any of the well known adsorbent materials generally utilized as a catalyst support or carrier material. Preferred adsorbent materials include the various charcoals produced by the destructive distillation of wood, peat, lignite, nutshells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin, and the like, and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. For example, in the treatment of a sour petroleum distillate, the adsorbent support should be insoluble in, and otherwise inert to, the hydrocarbon fraction at the alkaline reaction conditions existing in the treating zone. Charcoal, and particularly activated charcoal, is preferred because of its capacity for metal chelates, and because of its stability under treating conditions.

Another necessary component of the catalytic composite used in sweetening a sour hydrocarbon fraction is a metal chelate which is dispersed on an adsorptive support. The metal chelate employed can be any of the various metal chelates known to the art as effective in catalyzing the oxidation of mercaptans contained in a sour petroleum distillate to disulfides. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., cobalt tetraphenylporphyrin sulfonate; corrinoid catalysts as described in U.S. Pat. No. 3,252,892, e.g., cobalt corrin sulfonate; chelate organometallic catalysts such as described in U.S. Pat. No. 2,918,426, e.g., the condensation product of an amino-phenol and a metal of Group VIII; and the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. Cobalt phthalocyanine and vanadium phthalocyanine are particularly preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. Other derivatives, particularly the carboxylated derivatives also may be employed. The carboxylated derivatives are readily prepared by the action of trichloroacetic acid on the metal phthalocyanine.

Although the predominant mode of sweetening employs a fixed bed of metal chelate supported on an adsorbent, where the metal chelate is insoluble in both the liquid hydrocarbon feed and aqueous caustic, there are situations where contacting a sour hydrocarbon feed with an aqueous solution of a water-soluble metal chelate as the oxidizing catalyst is a desirable, even preferred method of operation. For example, where the hydrocarbon feedstock contains appreciable quantities of sludge, or a particulates generally, using a fixed bed is not feasible because of bed plugging arising from the suspended solid material. A lingering challenge, and a continued problem, is in the use of the aforementioned water-soluble chelates with recovery of the metal chelate from aqueous solutions. Typically, aqueous solutions containing metal chelate were discarded after their effectiveness was exhausted. This practice is not only costly, but also poses disposal problems. Although the toxicity of many of the metal chelates used as oxidation catalysts is low, there is increasing regulatory pressure to minimize the discharge of heavy metals. Consequently, there is both an economic and environmental incentive to remove and, where possible, to recover the metal chelate from aqueous streams resulting from sweetening sour liquid hydrocarbon feedstocks with a water-soluble metal chelate.

Our initial attempt to achieve this result met with very limited success. Treating aqueous streams with solid adsorbent resulted in a relatively low removal of metal chelate, and even when removed from aqueous solution the metal chelate subsequently was only partially recovered from the adsorbent. This resulted in a secondary disposal problem, namely, that of a solid adsorbent-metal chelate mixture. Consequently, we were at an impasse until our discovery that certain classes of amines could be used to extract the metal chelate from aqueous solution. The amine extract may be treated in various ways, resulting in the recovery of metal values at one end of the spectrum to recovery of the metal chelate the other end of the spectrum. The invention which is the subject of this application uses a particular class of liquid secondary amines having at least 15 carbon atoms to perform the extraction. The amines of our invention have low solubility in water with a high affinity for metal chelate. The extracted metal chelate can be recovered from the amine solution by base neutralization of the amine-chelate complex to afford an aqueous basic chelate solution which can be recycled.

SUMMARY OF THE INVENTION

The purpose of this invention is to extract the metal chelates from aqueous streams used to sweeten sour hydrocarbons via oxidation catalyzed by water soluble metal chelate. An embodiment comprises extracting an aqueous solution containing metal chelate catalyst with an amine containing secondary amino groups and with at least 15 carbon atoms. In a more specific embodiment the amine is a liquid at 20° C. with a solubility in water at 25° C. of not more than 0.5 wt-%. In a still more specific embodiment the amine is a polybutyleneamine. In yet another embodiment the amine is an alcoholamine which is the condensation product of a group of primary amines with epihalohydrins. In still another specific embodiment the condensation product arises from reaction of primary amines with epichlorohydrin. Other purposes and embodiments will be apparent from the ensuing description.

DESCRIPTION OF THE INVENTION

Sweetening of a sour hydrocarbon feedstock according to our invention is effected by contacting the sour feedstock with an aqueous alkaline solution of a metal chelate, serving as an oxidation catalyst, in the presence of an oxidizing agent which generally is air. Metal chelates which are effective oxidation catalysts have been cited above. Those which contain adequate water solubility to be used in the practice of our invention generally are trisulfonated or tetrasulfonated materials. It is well known that with increasing sulfonation, the metal chelates of this invention show increasing water solubility, allowing their use in sweetening via a 2-phase hydrocarbon-water system; see U.S. Pat. Nos. 4,003,827 and 4,078,992.

Sweetening of the sour hydrocarbon feedstock may be effected in any suitable manner and may be in a batch or in a continuous process. In a batch process the sour hydrocarbon feedstock is introduced into a reaction zone containing the metal chelate oxidation catalyst in an alkaline aqueous solution, and air is introduced therein. Preferably, the reaction zone is equipped with suitable stirrers or other mixing devices to obtain intimate mixing. In a continuous process the alkaline solution containing metal chelate catalyst is passed countercurrently to an ascending stream of sour hydrocarbon feedstock in the presence of a continuous stream of air. In a mixed type process the reaction zone contains alkaline solution of metal chelates, and sour feedstock and air are continually passed through the reaction zone and removed generally from the upper portion of the reaction zone. Sweetening may be affected at ambient temperature in most cases. However, occasionally an elevated temperature may be employed and generally will be in the range of from about 100° to about 400° F.

Our contribution to this process is the selected removal of the metal chelate from the aqueous solution by extraction with an amine. It is necessary for the practice of this invention that the amine be 1.) a secondary amine or contain secondary amino groups, 2.) a liquid, and 3.) as sparingly soluble in water as feasible. It is necessary that the solubility be not more than about 0.5 wt-%, but it is even more preferred that the amine be soluble to an extent of not more than about 0.2 wt-%, at a temperature of 20° C. A secondary but important limitation is that the secondary amines of our invention contain at least 15 carbon atoms.

Among the amines which are preferred in the practice of this invention are the polyalkyleneamines. Polyisobuteneamines and polyisobutylene amines in the molecular weight range 320–2300 are particularly useful in the practice of this invention.

Another class of amines which may be used in the practice of our invention are alcoholamines which are polyamines and the condensation products of a class of monoamines and dimes with epihalohydrins. These products and their method of preparation are fully described in U.S. Pat. Nos. 3,017,258 and 3,189,652; see also 3,457,053 and 3,929,655. The class of amines used in the condensation with epihalohydrins have the general structure $R_1NH_2$ and $R_1NH(CHR_2)_xNH_2$, i.e., the class consists of N-monoalkyl amines and N-monoalkylalkylene diamines. $R_1$ is an alkyl or alkenyl group having from 1 up to about 40 carbon atoms, although the class where $R_1$ has from 10 up through about 22 carbon atoms is preferred. This latter class may be generally referred to as fatty alkyl groups, since they may be thought of as being derived from fatty acids. Examples of suitable alkyl groups include methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, oleyl, linoleyl, linolenyl, heneicosyl, docosyl, tricosyl, tetracosyl, pentacosyl, hexacosyl, heptacosyl, octacosyl, nonacosyl, triacontyl, hentriacontyl, dotriacontyl, tritriacontyl, tetratriacontyl, pentatriacontyl, hexatriacontyl, heptatriacontyl, octatriacontyl, nonatriacontyl, and tetracontyl.

The group $R_2$ is most often hydrogen, i.e., the alkylene group is an unsubstituted, unbranched alkylene group. However, it is possible to have branched alkylene groups, in which case at least one of $R_2$ is an alkyl group different from hydrogen. Although $R_2$ may be an alkyl group containing up to about 5 carbon atoms, the methyl group is by far the most common one. The value of x is between 2 and about 6, with the case where x=3 being highly preferred.

The alcoholamine condensation products which are the polyamines of this invention are formed by reacting the aforementioned amines with epihalohydrins. By "epihalohydrins" is meant compounds having a halogen on a carbon atom adjacent to an epoxide linkage. Although epichlorohydrin is by far the most preferred material, other epihalohydrins may be used as exemplified by 1,2-epoxy-3-chlorobutane, 1-bromo-2,3-epoxybutane, 1-bromo-2,3-epoxypentane, 2-chloro-3,4-epoxypentane, 3-bromo-1,2,-epoxypentane, and so forth. Chlorine is the favored halogen, principally because of the availability of the corresponding chlorohydrin relative to other epihalohydrins.

The alcoholamine condensation products are formed by reacting from 0.5 up to about 2 moles of the epihalohydrin per mole of the amine at a temperature between about 20 to about 150° C. for a time effective to consume all of the epihalohydrin. Additional condensation is effected by adding a strong base, such as sodium hydroxide, in an amount sufficient to neutralize all of the hydrogen halide formed in the initial reaction and which is bound by amine as well as to convert chlorohydrin to epoxide which reacts further with amine. Addition of a strong base affords free amine and subsequent heating of the reaction mixture, usually in the range of 50°–100° C., results in condensation of the initial products to give polymeric reaction products, usually containing in the range of 3–20 recurring units. Multiple reactions are believed to occur; where epichlorohydrin is used as a representative epihalohydrin and a N-alkylpropylenediamine is the representative amine, the products include 3-(N-alkylaminopropyl)amino-1,2-epoxypropane, 1,3-bis(N-alkylaminopropyl)amino-2-propanol, 3-(N-alkylaminopropyl)amino-1-chloro-2-propanol, and branched materials containing tertiary, and even some quaternary, amine structures. It needs to be emphasized that the condensation products being used as the polyamines of this invention are fully taught in the cited prior art.

It also may be mentioned that the N-monoalkylalkylene diamines used in the preparation of the foregoing condensation products are themselves useful as secondary amines in the practice of this invention. Low water solubility is assured when the N-alkyl group is sufficiently long to impart hydrocarbon-like properties to the polyamine. In the practice of our invention this occurs when the amine has at least about 5 carbon atoms. In general, the class where $R_1$, in the formula $R_1NH(CHR_2)_xNH_2$, contains from 10 up to about 40 carbon atoms, with those having from 10 up to about 22 carbon atoms preferred; vide supra.

Another general class of amines which may be successfully utilized in the practice of this invention are the secondary amines of formula $R_1R_2NH$, where $R_1$ and $R_2$ each are alkyl groups and where the total number of carbon atoms in the amine is at least 15. It is especially desirable that the total number of carbons be in the range from about 20 up to about 40. Clearly this is a large class of secondary amines, but it is believed that all members can be successfully employed in our invention. The variant where the amine contains 20–30 carbon atoms, and where each of $R_1$ and $R_2$ are similar (although not exactly the same) in chain length is a preferred mode in our invention.

Extraction of aqueous solutions of the metal chelates by the liquid secondary amines of this invention occurs because the amines form acid-base complexes with the acidic metal chelates of this invention. Accordingly, several alternatives are available depending upon whether one wants to recover only the metal values or recover the metal chelate itself. For example, the amine extract could be burned which would leave the metal values as a residue. Another option is to remove the secondary amine by distillation to leave the metal chelate. The metal chelates generally are stable even up to 400° C. in air, consequently can be expected to survive distillation conditions for the liquid secondary amines even where the latter decompose. The route preferred for its minimal environmental impact is to regenerate the amine by treatment with aqueous base with recovery of a basic aqueous solution of the metal chelate which can be recycled directly to the sour hydrocarbon feedstock. In this option the nature and concentration of the aqueous base is unimportant. Alkali metal hydroxides and carbonates, especially of the alkali metals, particularly sodium, are the most frequently used as the aqueous base, but the choice of aqueous base and the concentration is not critical to the success of our invention. Concentrations from perhaps 1 weight percent base up to as high as perhaps 30 weight percent are frequently used.

The following merely illustrates the practice of our invention in a representative manner, and is not intended to limit or circumscribe our invention in any way.

EXAMPLE 1

Extraction of Cobalt Phthalocyanine. An aqueous feedstock containing a mixture of polysulfonated cobalt phthalocyanines in an amount corresponding to 150 ppm cobalt was extracted with 2 g. of a secondary amine [Rohm and Haas LA-1, molecular weight ca. 350–410]. The aqueous portion was analyzed before and after extraction with results shown in the following table.

TABLE 1

| Extraction of Cobalt Phthalocyanines | |
|---|---|
| | Co (ppm) |
| Initial feed | 150 |
| Aqueous layer after extraction | 35 |

The foregoing results show that close to 80% recovery from the aqueous stream of the metal chelate used as an oxidation catalyst in removal of sulfur from hydrocarbons is attained by extraction with secondary amine.

EXAMPLE 2

Extraction of Cobalt Phthalocyanine; polyisobutylene amine. An aqueous feedstock containing a mixture of polysulfonated cobalt phthalocyanines similar to that above in an amount corresponding to 451 ppm Co was extracted with 10 g polyisobutylene amine. The aqueous layer was analyzed after extraction and found to contain 0.5 ppm Co, which is tantamount to greater than 99% removal.

EXAMPLE 3

Recovery of Cobalt Phthalocyanine. The following procedure may be viewed as representative of a general recovery procedure for the metal chelates from a liquid secondary amine solution.

The solution of cobalt phthalocyanine in a liquid secondary amine, resulting from extraction such as that described above, may be agitated with an aqueous base to break the amine-metal chelate acid-base complex and afford an organic layer of amine and an aqueous layer of metal chelate. The aqueous layer may be recycled directly to sweetening a sour petroleum feedstock, the base may be neutralized by addition of acid or removed via ion exchange, or water may be removed by distillation to afford metal chelate directly.

What is claimed is:

1. A process of extracting dissolved metal chelates of tetrapyridinoporphyrazine, porphyrin, phthalocyanine, and corrin from an aqueous solution comprising extracting said aqueous solution with a liquid amine of total carbon number at least 15 containing secondary amino groups, and having a water solubility of not more than 0.5 weight percent, and recovering an extract of the metal chelate dissolved.

2. The process of claim 1 where said amine is a liquid at 50° C. and is soluble in water at 25° C. to the extent of not more than 0.5 weight percent.

3. The process of claim 1 where said amine is soluble in water at 25° C. to the extent of not more than 0.2 weight percent.

4. The process of claim 1 where said amine is a polybutylene amine or polyisobutylene amine.

5. The process of claim 1 where said amine is the condensation product of an N-alkyl-1,3-propanediamine with epichlorohydrin, where said alkyl group contains from about 10 up to about 20 carbon atoms.

6. The process of claim 1 where said amine is a secondary amine of formula $R_1R_2NH$, where each of $R_1$ and $R_2$ are alkyl groups and where the secondary, amine has a total carbon number of at least 15.

7. The process of claim 6 where separating the amine is affected by mixing an aqueous base with said extract, and recovering an aqueous basic solution of the metal chelate.

8. The process of claim 1 where said amine is a polyamine of formula $R_3NH(CHR_4)_xNH_2$ where $R_3$ is an alkyl or alkenyl group having from 10 up through about 40 carbon atoms, $R_4$ is hydrogen or an alkyl group having 1 up to 5 carbon atoms, and x is an integer from 2 up to 6.

9. The process of claim 1 further characterized by separating the amine from the extracted metal chelate dissolved in said extract.

* * * * *